US012148948B2

(12) United States Patent
Naitoh et al.

(10) Patent No.: US 12,148,948 B2
(45) Date of Patent: Nov. 19, 2024

(54) BATTERY PACK

(71) Applicant: Vehicle Energy Japan Inc., Hitachinaka (JP)

(72) Inventors: Masashi Naitoh, Hitachinaka (JP); Masayuki Nakamoto, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 459 days.

(21) Appl. No.: 17/635,948

(22) PCT Filed: Aug. 28, 2020

(86) PCT No.: PCT/JP2020/032511
§ 371 (c)(1),
(2) Date: Feb. 16, 2022

(87) PCT Pub. No.: WO2021/049315
PCT Pub. Date: Mar. 18, 2021

(65) Prior Publication Data
US 2022/0294074 A1    Sep. 15, 2022

(30) Foreign Application Priority Data
Sep. 10, 2019 (JP) ................................ 2019-164441

(51) Int. Cl.
*H01M 50/342* (2021.01)
*H01M 50/271* (2021.01)

(52) U.S. Cl.
CPC ..... *H01M 50/3425* (2021.01); *H01M 50/271* (2021.01); *H01M 2220/20* (2013.01)

(58) Field of Classification Search
CPC ................................................ H01M 50/3425
See application file for complete search history.

(56) References Cited

U.S. PATENT DOCUMENTS

| 2012/0263982 | A1 | 10/2012 | Yasui et al. |
| 2015/0072184 | A1 | 3/2015 | Kusunoki et al. |
| 2023/0070149 | A1* | 3/2023 | Park ................... H01M 50/178 |

FOREIGN PATENT DOCUMENTS

| CN | 218513525 U | * | 2/2023 |
| CN | 116345017 A | * | 6/2023 |

(Continued)

OTHER PUBLICATIONS

Machine translation of the PCT Preliminary Report of Patentability (no date) (Year: 0000).*

(Continued)

*Primary Examiner* — Amanda C. Walke
(74) *Attorney, Agent, or Firm* — Crowell & Moring LLP

(57) ABSTRACT

Provided is a battery pack capable of accumulating gas released from a battery cell in the battery pack as much as possible while suppressing the other battery cells from becoming hot due to the gas. The battery pack 100 includes a battery module 30, an electrical unit 50, and a housing 70. The housing 70 internally has a first storage space 70a that stores the battery module 30 and a second storage space 70b that stores the electrical unit 50. A part of the housing 70 defining the second storage space 70b includes a duct 80 that communicates the second storage space 70b with an outside of the housing 70. The duct 80 includes a filter 91 that closes a gas flow path 80a of the duct 80. In response to a gas pressure in the second storage space 70b reaching a predetermined value or more relative to an atmospheric pressure outside the housing 70, the filter 91 opens the flow path 80a of the duct 80.

12 Claims, 10 Drawing Sheets

(56) References Cited

FOREIGN PATENT DOCUMENTS

| | | | |
|---|---|---|---|
| CN | 113782910 B | * | 9/2023 |
| CN | 219832764 U | * | 10/2023 |
| EP | 3 367 494 A1 | | 8/2018 |
| JP | 2013-25983 A | | 2/2013 |
| JP | 2015-56325 A | | 3/2015 |
| JP | 2016-54127 A | | 4/2016 |
| JP | 2017-134952 A | | 8/2017 |
| JP | 2018-142540 A | | 9/2018 |
| WO | WO 2012/073438 A1 | | 6/2012 |

OTHER PUBLICATIONS

Chinese-language Office Action issued in Chinese Application No. 2020800577366 dated Dec. 26, 2023 (7 pages).

Chinese-language Office Action issued in Chinese Application No. 202080057736.6 dated Jun. 17, 2023 (11 pages).

International Search Report (PCT/ISA/210) issued in PCT Application No. PCT/JP2020/032511 dated Nov. 17, 2020 with English translation (four (4) pages).

Japanese-language Written Opinion (PCT/ISA/237) issued in PCT Application No. PCT/JP2020/032511 dated Nov. 17, 2020 (five (5) pages).

Japanese-language International Preliminary Report on Patentability (PCT/IPEA/409) issued in PCT Application No. PCT/JP2020/032511 dated Oct. 21, 2021 (seven (7) pages).

* cited by examiner

BATTERY PACK

TECHNICAL FIELD

The present invention relates to battery packs, each including a battery module having a plurality of battery cells and a housing that stores the battery module.

BACKGROUND ART

Conventionally, aqueous solution batteries such as lead-acid batteries, nickel-cadmium batteries, and nickel-hydrogen batteries have been the mainstream in the field of rechargeable batteries. As electrical equipment has become smaller and lighter in weight, attention has been paid to lithium-ion secondary batteries having a high energy density, and the research, development, and commercialization of these batteries are progressing rapidly. In addition, due to the problems of global warming and depleted fuel, electric vehicles (EVs) and hybrid electric vehicles (HEVs) that partially assist the drive with electric motors have been developed by automobile manufacturers, and a secondary battery with high capacity and high output is required as the power source.

As a power source that meets these requirements, high-voltage, non-aqueous solution lithium-ion secondary batteries have been attracting attention. In particular, square lithium-ion secondary batteries equipped with flat box-shaped battery containers have excellent volumetric efficiency when packed, so demand for them as power sources to be mounted on HEVs, EVs, or other devices has increased. The square secondary batteries (battery cells) with such a sealed battery container have the problem that the pressure inside the battery container increases due to overcharging, overheating, or damage caused by external forces. Then, the square secondary batteries are provided with a gas release valve that releases gas when the internal pressure rises.

Patent Literature 1, for example, discloses a battery pack having a plurality of battery cells with such a gas release valve. The battery pack of Patent Literature 1 has a plurality of elementary batteries that are secondary batteries, an exhaust path that allows gas generated from the elementary batteries to pass through, a case that houses the plurality of elementary batteries and the exhaust path, and a gas release duct that is attached to the case and releases gas that have passed through the exhaust path to the outside.

CITATION LIST

Patent Literature

Patent Literature 1: WO2012/073438

SUMMARY OF INVENTION

Technical Problem

The battery pack described in Patent Literature 1 internally has the exhaust path that lets gas released from the elementary batteries pass through, and thus prevents the gas released from one of the elementary batteries from increasing the temperature of other elementary batteries. The battery pack described in Patent Literature 1, however, is configured so that the gas released from the elementary batteries just goes to the exhaust path in the battery pack. This means that the gas pressure in the exhaust path rises even when a relatively small amount of gas is released. Then the lid of the gas release duct opens the gas release duct, and releases the gas to the outside of the battery pack. Since this gas contains harmful components, it is desirable to accumulate the gas in the battery pack whenever possible.

In view of these points, the present invention provides a battery pack capable of accumulating gas released from a battery cell in the battery pack as much as possible while suppressing the other battery cells from becoming hot due to the gas.

Solution to Problem

To solve the above problems, a battery pack according to the present invention includes: a battery module including a stack of a plurality of battery cells; an electrical unit electrically connected to the battery module; and a housing that stores the battery module and the electrical unit. Each battery cell includes a gas release valve. The housing internally has a first storage space that stores the battery module and a second storage space that stores the electrical unit. The first storage space and the second storage space are in communication while storing the battery module and the electrical unit. A part of the housing defining the second storage space includes a duct that communicates the second storage space with an outside of the housing. The duct includes a closing member that closes a passage of the duct. In response to a gas pressure in the second storage space reaching a predetermined value or more relative to an atmospheric pressure outside the housing, the closing member opens the passage of the duct.

Advantageous Effects of Invention

The present invention provides a battery pack capable of accumulating gas released from a battery cell in the battery pack as much as possible while suppressing the other battery cells from becoming hot due to the gas.

DESCRIPTION OF EMBODIMENTS

The following describes battery packs according to some embodiments of the present invention.

First Embodiment

Figure 1:
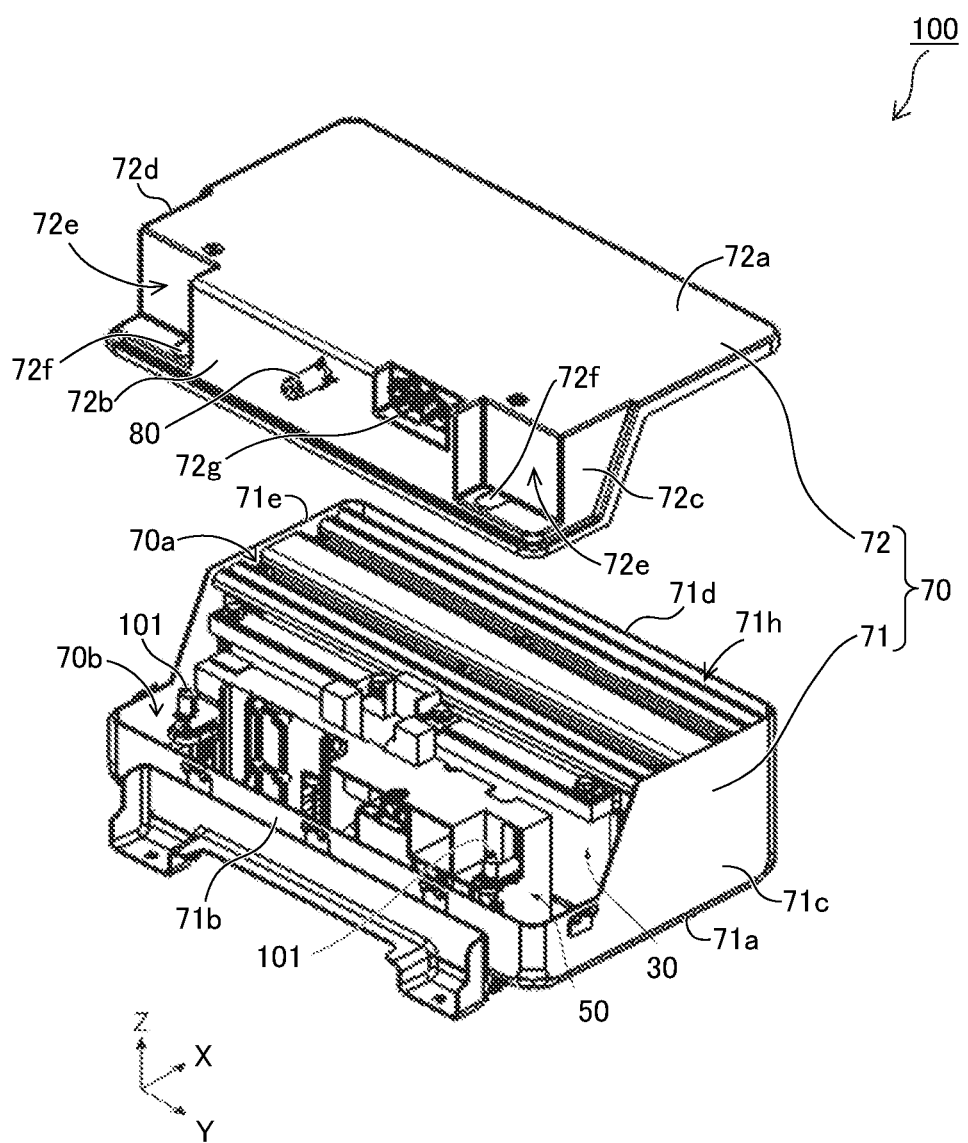
FIG. 1 is an exploded perspective view of a battery pack according to a first embodiment of the present invention.
Figure 2:
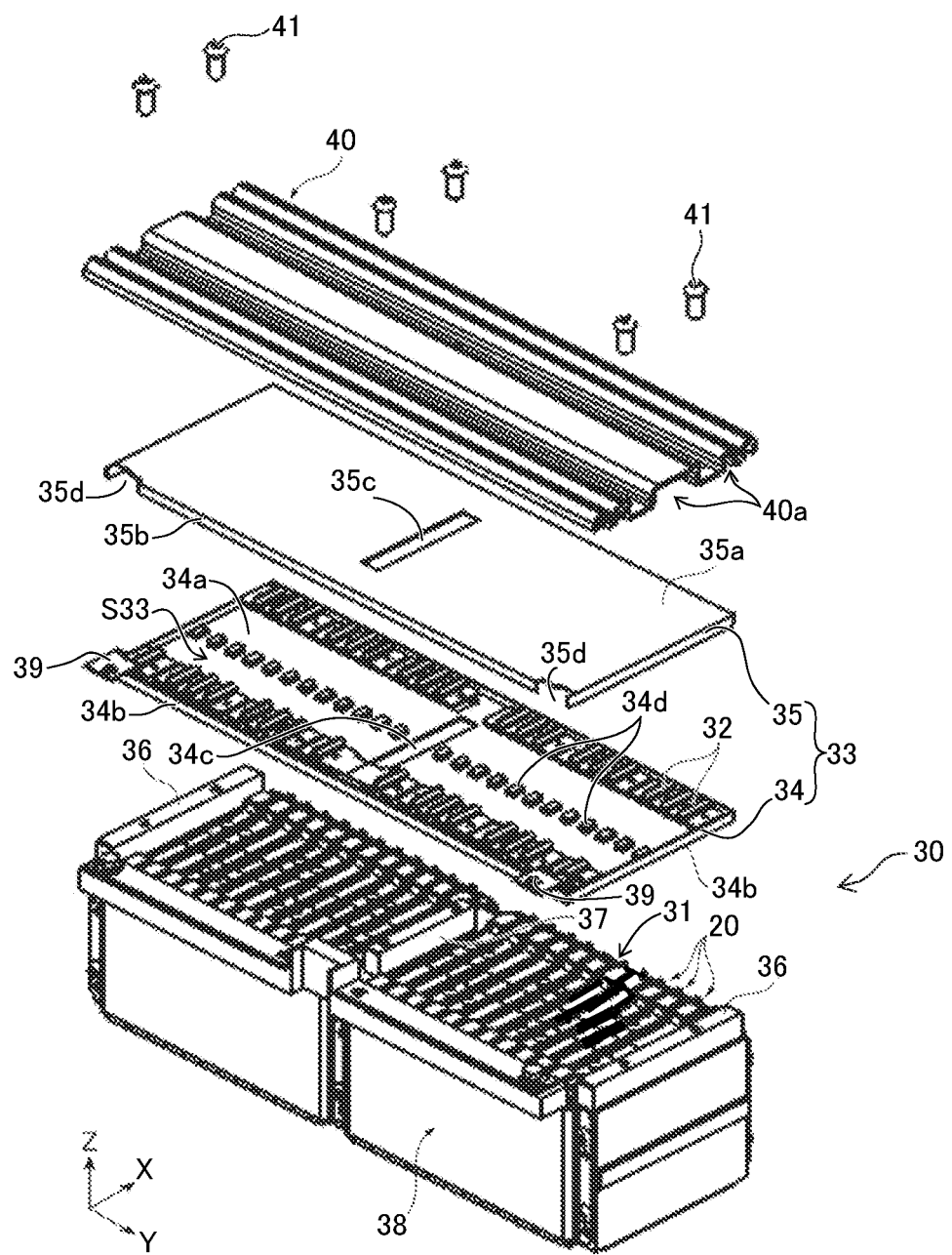
FIG. 2 is an exploded perspective view of a battery module of the battery pack according to the first embodiment of the present invention.

FIG. 1 is an exploded perspective view of a battery pack 100 according to a first embodiment of the present invention. FIG. 2 is an exploded perspective view of a battery module 30 of the battery pack 100 according to the first embodiment of the present invention.

The battery pack 100 that is the first embodiment of the present invention is mounted on a vehicle such as an electric vehicle (EV) or a hybrid electric vehicle (HEV). The battery pack 100 stores electric power in the battery cells 20, the electric power being supplied through a pair of input/output terminals 101 described later, and supplies the electric power stored in the battery cells 20 to an electric device such as a vehicle motor via the input/output terminals 101.

The battery pack 100 includes a battery module 30 having the plurality of battery cells 20 that are secondary batteries, an electrical unit 50 including electrical components placed at a predetermined distance from the battery module 30 and electrically connected to the battery module 30, and a housing 70 storing the battery module 30 and the electrical unit 50.

The housing 70 has a substantially cuboid box shape. To simplify the explanation, the depth direction of the housing 70 is defined as X direction, the width direction as the Y direction, and the height direction as the Z direction. In the relative relationship between the body 71 of the housing and the lid 72, let that the lid 72 is on the upper side and the housing body 71 is on the lower side. The dimension of the housing 70 in the width direction (Y direction) is larger than that in the depth direction (X direction), and the dimension in the depth direction (X direction) is larger than that in the height direction (Z direction).

The housing 70 includes the housing body 71 that has a box shape opening upward, in which the battery module 30 is placed, and the lid 72 that covers the upper opening of the housing body 71. The housing body 71 is made of a metal material, such as electrogalvanized steel sheet. The lid 72 is made of a resin material such as polybutylene terephthalate (PBT).

The housing body 71 has a bottom face 71a on which the battery module 30 and the electrical unit 50 are placed, and side walls 71b, 71c, 71d, and 71e that rise from the peripheral edge of the bottom face 71a. The side wall 71b is placed on one side in X direction, the side wall 71c is placed on one side in Y direction, the side wall 71d is placed on the other side in X direction, and the side wall 71e is placed on the other side in Y direction. The side wall 71b is configured to be lower than the side wall 71d. The side walls 71c and 71e are placed to connect the side wall 71b with the side wall 71d so that the height decreases from the side wall 71d to the side wall 71b.

The lid 72 has a top face 72a and side walls 72b, 72c and 72d extending downward from the peripheral edge of the top face 72a. The side wall 72b is placed at one end of the top face 72a in X direction. The side wall 72c is placed at one end of the top face 72a in Y direction, so as to face the side wall 71c of the housing body 71. The side wall 72d is placed at the other end of the top face 72a in Y direction, so as to face the side wall 71e of the housing body 71.

The lid 72 has recesses 72e at both ends of one side of the lid 72 in X direction. Each recess 72e has a through hole 72f at a portion corresponding to the input/output terminal 101 described later to expose the input/output terminal 101. The lid 72 further has a signal connector 72g and a duct 80 at predetermined positions on the side wall 72b. The detailed structure of the duct 80 will be described later.

Among the top face 72a, the side wall 72b, the side wall 72c, and the side wall 72d making up the resin lid body 72, the top face 72a has a flat surface having the largest area. With this configuration, when the gas pressure inside the housing 70 rises as described below, the top face 72a will deform (expand) significantly, allowing the volume inside the housing 70 to be large. This allows more gas to accumulate in the housing 70 than a lid 72 made of metal.

The housing 70 internally has a first storage space 70a that stores the battery module 30 and a second storage space 70b adjacent to the first storage space 70a on one side in X direction and storing the electrical unit 50. The first storage space 70a and the second storage space 70b are in communication while storing the battery module 30 and the electrical unit 50 therein.

The inner face defining the first storage space 70a of the housing 70 and the battery module 30 have a gap (hereinafter, also referred to as a gap in the first storage space 70a) therebetween. The size of the gap in the first storage space 70a refers to the volume of the first storage space 70a excluding the volume of the battery module 30 that is stored in the first storage space 70a of the housing 70. The inner face defining the second storage space 70b of the housing 70 and the electrical unit 50 have a gap (hereinafter, also referred to as a gap in the second storage space 70b) therebetween. The size of the gap in the second storage space 70b refers to the volume of the second storage space 70b excluding the volume of the electrical unit 50 that is stored in the second storage space 70b of the housing 70.

The present embodiment is configured so that the gap in the second storage space 70b is larger than the gap in the first storage space 70a. Specifically, the top face of the electrical unit 50 is lower than the top face of a reinforcing member (metal plate) 40 described later, and is lower than the top face of the battery module 30 (the top face of a busbar holder 33 described later). With this configuration, the upper gap in the second storage space 70b is larger than the upper gap in the second storage space 70b. That is, the space above the electrical unit 50 where gas flows in is larger than the space above the battery module 30 where gas flows in. Further, the distance from both end faces of the electrical unit 50 in Y direction to the inner face of the housing 70 is larger than the distance from both end faces of the battery module 30 in Y direction to the inner face of the housing 70. With this configuration, the gap at both ends in the longitudinal direction of the second storage space 70b is larger than the gap at both ends in the longitudinal direction of the first storage space 70a. That is, the space lateral of the electrical unit 50 where gas flows in is larger than the space lateral of the battery module 30 where gas flows in.

In this way, the gap in the second storage space 70b is larger than the gap in the first storage space 70a, so that as described below, the gas released from the gas release valves 10 of the battery cells 20 is released from the gap in the first storage space 70a and flows mainly into the gap in the second storage space 70b. This means that the gap in the second storage space 70b functions as a gas reservoir that accumulates the gas released from the gas release valves 10 of the battery cells 20.

As shown in FIG. 2, the battery module 30 has a battery stack 31, a plurality of cell holders (not shown), a plurality of busbars 32, a busbar holder (cover) 33, a pair of end plates 36, an intermediate plate 37, and four side plates 38. The battery stack 31 is a stack of the plurality of battery cells 20. The plurality of cell holders (not shown) each hold a corresponding one of the plurality of battery cells 20. The plurality of busbars 32 electrically connect adjacent battery cells 20 to each other. The busbar holder 33 holds the plurality of busbars 32. The end plates 36 are placed at one end and at the other end of the stacking direction of the battery stack 31. The intermediate plate 37 is placed at the center of the battery stack 31 in the stacking direction. Two of the side plates 38 are placed at one end and at the other end of the transverse direction (X direction) of the battery stack 31.

The following describes the battery module 30 in more details.

Figure 3:
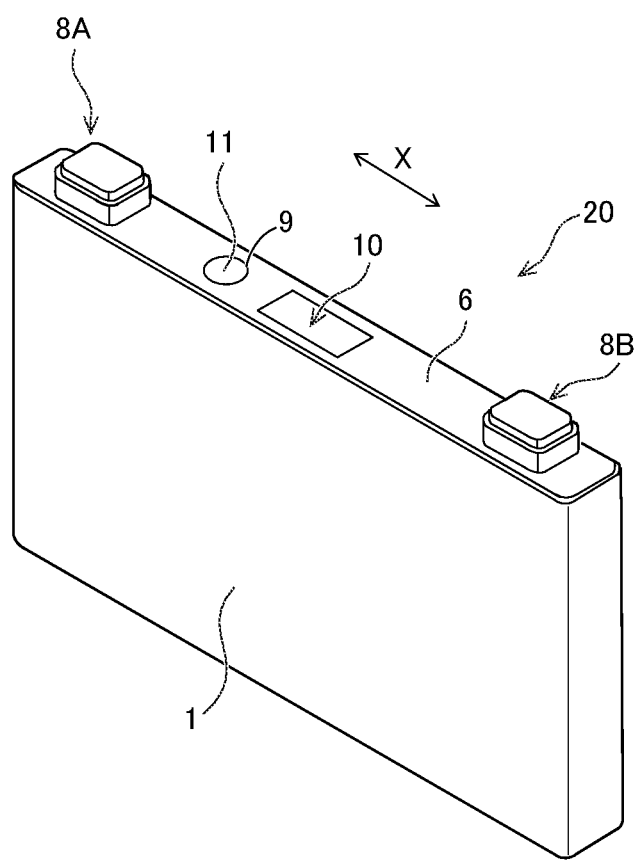
FIG. 3 is a perspective view of the structure of a battery cell of the battery pack according to the first embodiment of the present invention.

As shown in FIG. 3, each battery cell 20 of the battery stack 31 includes a battery case 1 and a lid 6. The battery case 1 internally stores a group of electrodes (not shown), which is a power generator, and the lid 6 seals the upper opening of the battery case 1. The lid 6 is welded to the battery case 1 by laser welding, and the battery case 1 and the lid 6 make up a battery container.

A positive external terminal 8A and a negative external terminal 8B are placed at both ends of the lid 6 in the longitudinal direction (X direction). These positive external terminal 8A and negative external terminal 8B each have a substantially cuboid shape protruding from the top face of the lid 6 toward a reinforcing member 40 described later. The electrode group (not shown) is charged via these positive external terminal 8A and negative external terminal 8B, and power is supplied to the external load similarly. The lid 6 has the gas release valve 10, which is integral with the lid 6, at the center of the longitudinal direction (X direction). The gas release valve 10 is formed by thinning a part of the lid 6 to form a slit-like groove. If the pressure inside the battery cell 20 rises and exceeds a predetermined pressure due to some abnormality, the gas release valve 10 opens to release gas from the inside of the battery cell 20. This reduces the pressure inside the battery cell 20, and keeps the safety of the battery cell 20. The lid 6 has a liquid injection plug 11 welded thereto, to which a liquid injection port 9 for injecting an electrolytic solution into the battery case 1 is sealed.

The plurality of battery cells 20 are stacked while reversing their directions so that the positive external terminal 8A of one of adjacent two battery cells 20 and the negative external terminal 8B of the other battery cell 20 are adjacent to each other in the stacking direction, thus forming the battery stack 31.

The end plates 36 are metal plates. As shown in FIG. 2, the top face of each end plate 36 is placed so as to be at the same height as the top face of the busbar holder 33 or slightly higher than the top face of the busbar holder 33. Each end plate 36 has threaded holes on the top face to fix the reinforcing member 40. Each end plate 36 has threaded holes on the bottom face to fix the end plate 36 to the bottom face 71a of the housing body 71.

The intermediate plate 37 is a metal plate. The top face of the intermediate plate 37 is placed so as to be at the same height as the top face of the busbar holder 33 or slightly higher than the top face of the busbar holder 33. The intermediate plate 37 has threaded holes on the top face to fix the reinforcing member 40. The intermediate plate 37 has threaded holes on both faces in Y direction to fix the side plates 38. The intermediate plate 37 has threaded holes on the bottom face to fix the intermediate plate 37 to the bottom face 71a of the housing body 71.

The side plates 38 are metal plates. The side plates 38 each have threaded holes on both faces in Y direction to fix the end plates 36. Each side plate 38 has threaded holes on the bottom face to fix the side plate 38 to the bottom face 71a of the housing body 71.

The busbar 32 is a conductive metal plate, and is welded to electrically connect the positive external terminal 8A and the negative external terminal 8B of the adjacent battery cells 20. This connects the plurality of battery cells 20 in series.

The busbar holder 33 is placed so as to cover the gas release valves 10 of the plurality of battery cells 20. The busbar holder 33 includes a holder body 34 to which the plurality of busbars 32 are attached, and a holder cover 35 attached to the holder body 34 so as to cover the plurality of busbars 32.

The holder body 34 is a plate or a frame made of resin having electrical insulation, such as polypropylene (PP). The holder cover 35 and the holder body 34 define a space S33 therebetween, and the configuration described later allows the gas released from a gas release valve 10 to flow more favorably into this space S33. Specifically, the holder body 34 includes a bottom face 34a, which faces the lid 6 of each battery cell 20 and to which the plurality of busbars 32 are attached, and four side walls 34b that rise from the peripheral edge of the bottom face 34a. The bottom face 34a has openings (not shown) at a portion located below the busbars 32. The openings receive the positive external terminals 8A and the negative external terminals 8B of the battery cells 20 for insertion. The bottom face 34a has an insertion hole 34c at a central portion in the longitudinal direction (Y direction), into which the intermediate plate 37 is inserted. The bottom face 34a has openings 34d at positions facing the gas release valves 10 of the battery cells 20, through which gas released from the gas release valves 10 passes. With this configuration, the gas released from the gas release valves 10 passes through the openings 34d of the holder body 34 and flows into the space S33.

The holder body 34 has terminals 39 electrically connected to the busbars 32 at both ends in Y direction on one side of the holder body 34 in X direction. These terminals 39 electrically connect the terminals of the electrical unit 50 with the busbars 32 located at one end and the other end of the plurality of busbars 32 in Y direction.

The holder body 35 is a plate made of resin having electrical insulation such as polypropylene (PP). The holder cover 35 electrically insulates the busbars 32 and the reinforcing member 40. The holder cover 35 has a top face 35a and four side walls 35b extending downward from the peripheral edge of the top face 35a. The top face 35a has an insertion hole 35c at a central portion in the longitudinal direction (Y direction), into which the intermediate plate 37 is inserted.

The holder cover 35 has cutouts 35*d* at both ends of the side wall 35*b* in Y direction that is on one side of the holder cover 35 in X direction. Each cutout 35*d* has a size having a gap from the terminal 39 when the holder cover 35 is attached to the holder body 34. With this configuration, the gas released from the gas release valves 10 and flows into the space S33 of the busbar holder 33 passes through the cutouts 35*d* and flows out to the one side in X direction. That is, the cutouts 35*d* function as a guide that guides the gas in the space S33 to the second storage space 70*b*. Note that the guide that guides the gas in the space S33 to the second storage space 70*b* is not limited to the cutouts 35*d*. For example, openings may be formed in the side wall 35*b* on one side of the holder cover 35 in X direction, or the side wall 35*b* on one side of the holder cover 35 in X direction may be omitted. In these cases as well, the gas in the space S33 is guided to the second storage space 70*b*.

The holder cover 35 having the cutouts 35*d* that guide the gas released from the gas release valves 10 to the second storage space 70*b* allows high-temperature gas released from a battery cell 20, if any, to be guided to the cutouts 35*d* from the space S33. This suppresses the flowing of the gas to other battery cells 20 through the openings 34*d* facing the other battery cells 20, and so suppresses the temperature rise of the other battery cells 20. This prevents abnormalities in the other battery cells 20 due to the heat.

The reinforcing member 40 between the busbar holder 33 and the lid 72 of the housing 70 covers the busbar holder 33. The reinforcing member 40 is a plate made of a metal material such as a galvanized steel plate, stainless steel, or an aluminum alloy. The reinforcing member 40 is placed to face the lid 6 of each battery cell 20 with the busbar holder 33 intervening therebetween. The reinforcing member 40 extends from one end to the other end in the longitudinal direction (Y direction) of the battery stack 31 and extends from one end to the other end in the transverse direction (X direction) of the battery stack 31.

The reinforcing member 40 is fixed to the end plates 36 and the intermediate plate 37 with a plurality of screws 41. The reinforcing member 40 is formed of sheet metal and has a plurality of grooves 40*a* extending in Y direction. With this configuration, when the gas released from a gas release valve 10 and flowing into the space S33 of the busbar holder 33 flows out from the gap between the edge of the insertion hole 35*c* of the holder cover 35 and the intermediate plate 37, the gas flows in Y direction while hitting the reinforcing member 40 to be cooled. This means that high-temperature gas does not directly hit the resin lid 72 of the housing 70, which suppresses the deformation, for example, of the lid 72 due to heat. Gas flows along the longitudinal direction (Y direction) of the reinforcing member 40, which keeps enough cooling time and cooling area of the reinforcing member 40 for the gas. This efficiently cools the high-temperature gas.

As shown in FIG. 1, the electrical unit 50 placed in the second storage space 70*b* of the housing 70 stores electrical components such as a control board to control the plurality of battery cells 20, relays and fuses, and an electrical holder storing the electrical components. The electrical holder is made of resin having electrical insulation such as polybutylene terephthalate (PBT). The electrical unit 50 has a substantially cuboid shape, and extends in Y direction.

The positive and negative input/output terminals 101 are provided at both ends in the longitudinal direction (Y direction) of the electrical unit 50. The positive input/output terminal 101 is electrically connected to the terminal 39 that is connected to the positive external terminals 8A of the battery cells 20 via the electrical components of the electrical unit 50, for example. The negative input/output terminal 101 is electrically connected to the terminal 39 that is connected to the negative external terminals 8B of the battery cells 20 via the electrical components of the electrical unit 50, for example.

In the present embodiment, the housing 70 includes the duct 80 that communicates the second storage space 70*b* with the outside of the housing 70. The duct 80 is to release the gas inside the housing 70 to the outside of the housing 70. The duct 80 is placed at a portion of the housing 70 that defines the second storage space 70*b* (in this embodiment, on the side wall 72*b* of the lid 72).

The duct 80, which is at the portion of the housing 70 defining the second storage space 70*b*, allows the gas generated in the first storage space 70*a* to pass through the second storage space 70*b* to a gas flow path 80*a* (passage) of the duct 80. In particular, the first storage space 70*a* tends to be hotter than the second storage space 70*b* storing the electrical unit 50, due to the heat generated by the battery cells 20, so that the gas in the first storage space 70*a* easily flows to the second storage space 70*b* at a low temperature. As a result, the gas in the first storage space 70*a* released from a gas release valve 10 is less likely to stay in the first storage space 70*a* and flow to other battery cells 20. Note that the duct 80 may be located elsewhere on the lid 72 or on the housing body 71, as long as it is a part of the housing 70 that defines the second storage space 70*b*.

Figure 4:
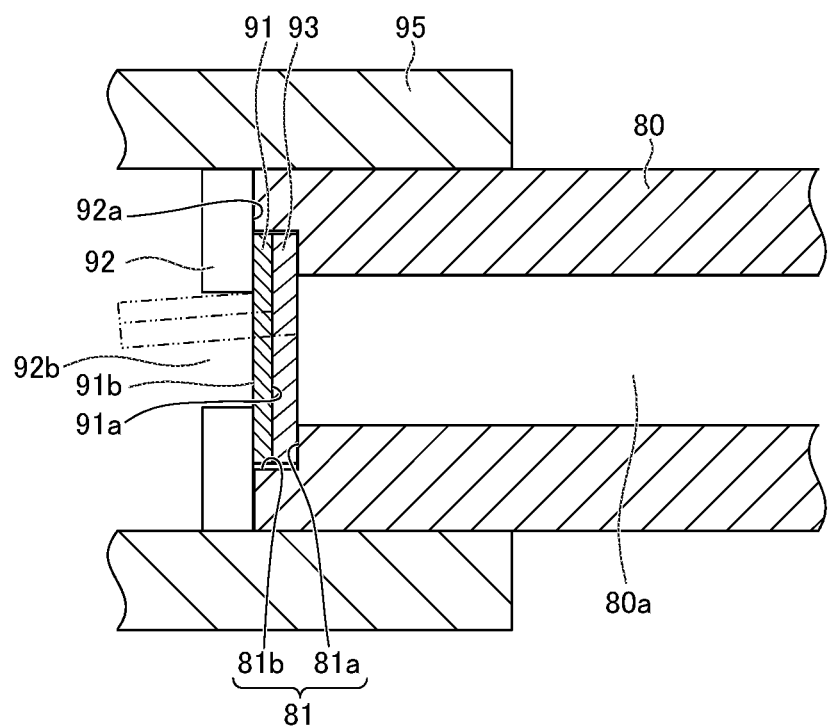
FIG. 4 is a cross-sectional view of the structure around the duct of the battery pack according to the first embodiment of the present invention.

As shown in FIG. 4, the duct 80 has a cylinder shape projecting outward from the side wall 72*b* of the lid 72. The duct 80 internally has a gas flow path (passage) 80*a* that leads to the internal space of the housing 70 (in this embodiment, to the second storage space 70*b*). In the present embodiment, the duct 80 is integral with the lid 72 of the resin housing 70. In another embodiment, the duct 80 may be attached to the lid 72. A filter (closing member) 91, a holder 92, and a pipe 95 are provided at the tip (downstream end) of the duct 80. In one example, the pipe 95 extends from the duct 80 to the outside of the vehicle at a position below the passenger compartment. This allows the pipe 95 to emit gas released from the battery pack 100 to the outside the vehicle, regardless of the position of the battery pack 100 in the vehicle. Therefore, unlike the configuration without the duct 80 and the pipe 95, the present embodiment prevents gas in the battery pack 100 from being emitted into the passenger compartment even when the battery pack 100 is located inside the passenger compartment. This means that the battery pack 100 can be placed in the passenger compartment of the vehicle.

The duct 80 is provided with the filter 91 capable of closing the gas flow path 80*a*. The filter 91 includes a circular sheet made of a resin material such as polytetrafluoroethylene (PTFE), which does not have gas permeability and has moisture permeability and waterproofness. The filter 91 closes the gas flow path 80*a* and confines the gas released from the gas release valve 10 of a battery cell 20 in the housing 70. The filter 91 also prevents foreign matter and water from entering the battery pack 100 from outside. This embodiment shows an example of the filter that does not have gas permeability, but has moisture permeability and waterproofness as the closing member of the present invention. The material of the closing member may be at least not gas permeable, and is not particularly limited.

The duct 80 has an engagement recess 81 along the entire inner peripheral face, and the engagement recess 81 engages with the edge of the filter 91. The engagement recess 81 has a first holding face 81*a* facing the edge of one face 91*a* of the filter 91 close to the second storage space 70b, and an inner peripheral face 81b facing the outer peripheral face of the filter 91. Hereinafter, the part of the duct close to the second storage space 70b (the gas inflow side of the duct 80) is also referred to as the "upstream" and the part opposite of the second storage space 70b (the gas outflow side of the duct 80) as the "downstream".

The holder 92 is fixed to the tip (downstream end) of the duct 80 using a fixing member (not shown). The holder 92 has a second holding face 92a that faces the edge of the downstream other face 91b of the filter 91. The filter 91 is held by the duct 80 and the holder 92 with the edge sandwiched between their first holding face 81a and the second holding face 92a.

The distance between the second holding face 92a and the first holding face 81a of the duct 80 is greater than the thickness of the filter 91. Then, a non-woven fabric 93 having a function as a cushion is placed on the upstream of the filter 91. This non-woven fabric 93 biases (pushes) the filter 91 toward the holder 92, whereby the filter 91 is held with the other face 91b in close contact with the holder 92, so that the battery pack 100 is sealed. Also, the edge of the filter 91 is not pinched (fixed) by the second holding face 92a and the first holding face 81a. In place of the non-woven fabric 93, another biasing member may be used to bias (for close contact) the filter 91 toward the holder 92. The non-woven fabric 93 or another biasing member may be omitted on the upstream of the filter 91. In this case, the distance between the second holding face 92a and the first holding face 81a of the duct 80 is set to be slightly larger than the thickness of the filter 91. Also in this case, as the gas pressure in the battery pack 100 rises, the filter 91 moves to the holder 92 to come into close contact with the holder 92, and the gas pressure keeps the close contact state.

Figure 5:
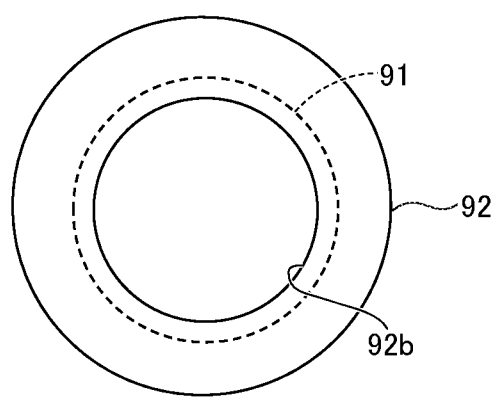
FIG. 5 shows the holder and the filter of FIG. 4, viewed from downstream.

The holder 92 has a through hole 92b, which penetrates through the holder 92 in the thickness direction, in the central portion so that the second holding face 92a has an annular shape. As shown in FIG. 5, the holder 92 is configured so that the edge of the through hole 92b overlaps (engages) over the entire circumference of the edge of the filter 91 when viewed from the downstream.

If some abnormality occurs in a battery cell 20 of the battery stack 31 and the internal pressure of the battery cell 20 exceeds a predetermined pressure, the gas release valve 10 will open and gas will be released into the housing 70. For example, when gas is released from one battery cell 20 at normal temperature, the gas pressure in the battery pack 100 and in the duct 80 increases, but the filter 91 keeps a close contact with the holder 92 to keep the sealing in the battery pack 100.

In contrast, if a large amount of gas is released from a battery cell 20 at a high temperature due to some abnormality, for example, the gas pressure inside the housing 70 rises rapidly. Then, when the gas pressure in the second storage space 70b (housing 70) becomes equal to or higher than a predetermined value relative to the atmospheric pressure outside the housing 70, the filter 91 deforms greatly due to the gas pressure, and enters the through hole 92b of the holder 92 (see the two-dot chain line in FIG. 4), or is detached from the holder 92 and passes through the through hole 92b. This opens the gas flow path 80a, so that the gas in the battery pack 100 is emitted outside the vehicle through the pipe 95. In this way, this configuration prevents the differential pressure between the gas pressure in the second storage space 70b and the atmospheric pressure outside the housing 70 from becoming larger than a predetermined value (hereinafter, also referred to as a limit pressure). In the following, the differential pressure between the gas pressure in the second storage space 70b and the atmospheric pressure outside the housing 70 may be referred to simply as a "differential pressure."

As mentioned above, the non-woven fabric 93, which functions as a cushion, is placed upstream of the filter 91. That is, the filter 91 is not tightly sandwiched between the first holding face 81a and the second holding face 92a. Therefore, the differential pressure (limit pressure) at which the filter 91 opens the gas flow path 80a, that is, the differential pressure (limit pressure) to release the engagement of the filter 91 may be set depending on the flexibility of the filter 91 and the structure (the diameter of the through hole 92b of the holder 92) holding the filter 91.

Figure 6:
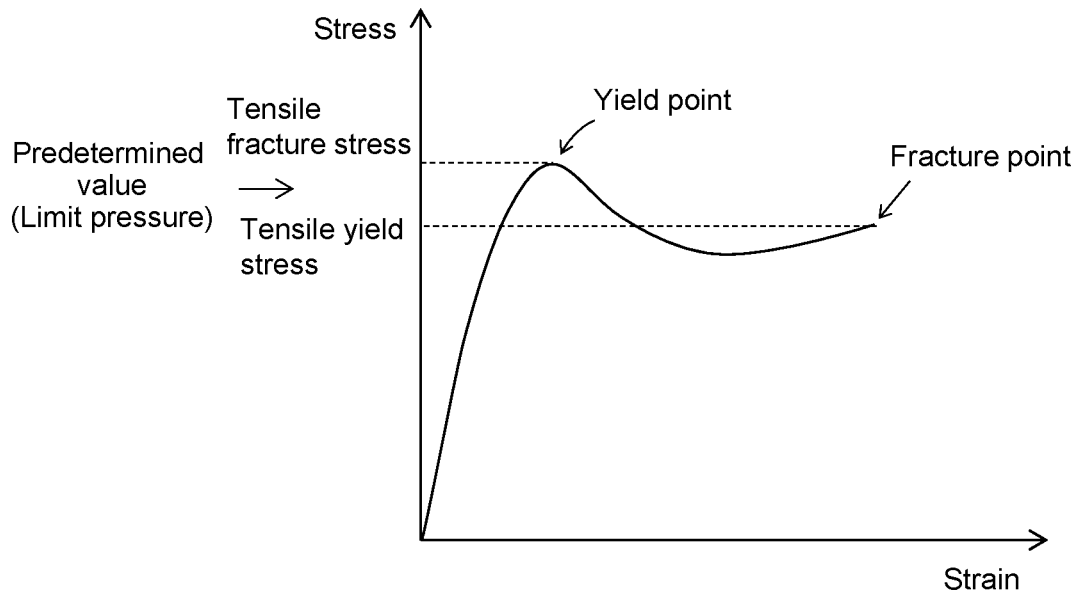
FIG. 6 shows the stress-strain curve of resin for the lid of the battery pack according to the first embodiment of the present invention.

Preferably the limit pressure at which the filter 91 opens the gas flow path 80a is as high as possible unless the battery pack 100 is damaged. This is because a higher limit pressure increases the amount of gas that can be accumulated in the battery pack 100. The stress-strain curve of the resin for the lid 72 is as shown in FIG. 6, for example, where the tensile yield stress is higher than the tensile fracture stress. Then, in the present embodiment, the limit pressure is set to be equal to or greater than the tensile fracture stress of the lid 72 and less than the tensile yield stress. The limit pressure less than the tensile yield stress allows the filter 91 to be detached to open the gas flow path 80a before the battery pack 100 is damaged by the gas pressure. This prevents damage of the battery pack 100. The limit pressure equal to or greater than the tensile fracture stress prevents the filter 91 from being detached at a low gas pressure to open the gas flow path 80a.

Figure 7:
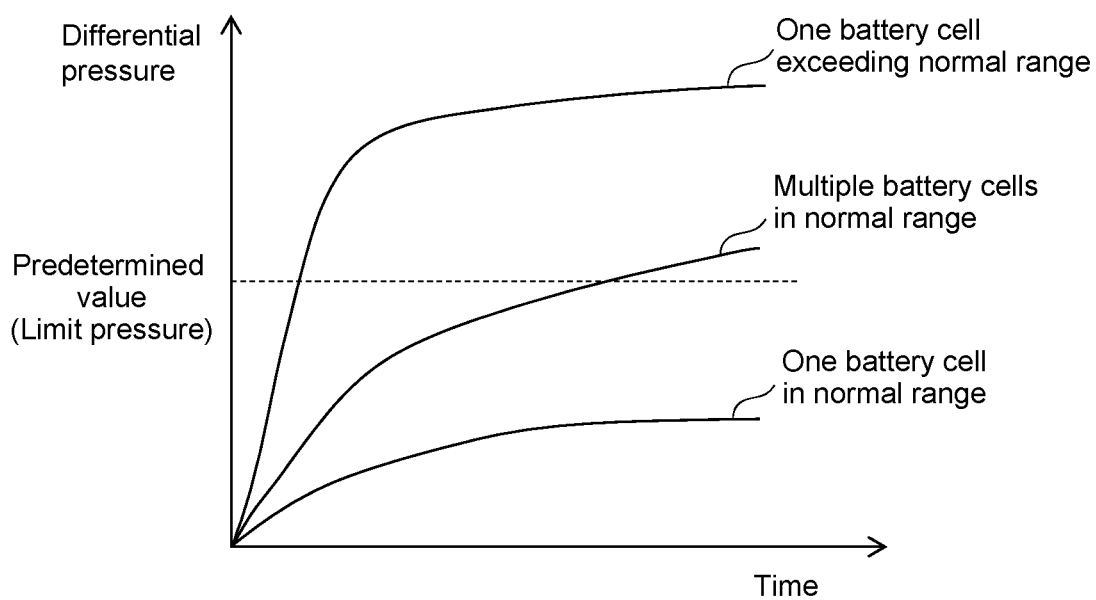
FIG. 7 shows a differential pressure between the gas pressure inside the housing and the atmospheric pressure outside the housing when gas is released from a battery cell.

As shown in FIG. 7, when gas is released from one battery cell 20 having a state of charge (SOC) in the normal range (for example, in the range of 30% or more and 70% or less), the amount of gas released is so small that the gas pressure in the battery pack 100 is low and the differential pressure is less than the limit pressure.

In contrast, if a large amount of gas is released from one battery cell 20 having the SOC exceeding the normal range, the gas pressure inside the battery pack 100 will exceed a predetermined value relative to the atmospheric pressure outside the housing 70. That is, the differential pressure becomes equal to or higher than the limit pressure. Gas may be released from a plurality of battery cells 20 having their SOC being in the normal range. In this case, the gas pressure inside the battery pack 100 exceeds a predetermined value relative to the atmospheric pressure outside the housing 70. That is, the differential pressure becomes equal to or higher than the limit pressure. The limit pressure set in this way opens the gas flow path 80a reliably when the gas pressure in the battery pack 100 rises significantly and the differential pressure becomes large, and thus prevents damage of the battery pack 100 reliably.

As described above, this embodiment is configured so that gas released from the gas release valve 10 of a battery cell 20 is emitted into the first storage space 70a and accumulated in the housing 70 as a whole (first storage space 70a and second storage space 70b). This increases the volume for accumulating the gas to be larger than the configuration as in Patent Literature 1 that accumulates gas in the exhaust path in the battery pack, and thus reduces the increase in gas pressure inside the battery pack 100 when gas is released from the battery cells 20. This prevents the gas pressure inside the housing 70 from becoming higher than a predetermined value relative to the atmospheric pressure outside the housing 70, and thus accumulates more gas inside the housing 70. This embodiment does not have the exhaust path that partitions the inside of the battery pack 100, which makes the battery pack 100 compact.

The duct 80 placed at the portion of the housing 70 that defines the second storage space 70b makes the second storage space 70b negatively pressurized when gas is released to the outside of the housing 70 via the duct 80. This allows the gas in the first storage space 70a released from the gas release valve 10 to easily flow to the second storage space 70b, thus preventing the hot gas from flowing to the other battery cells 20.

The duct 80 is provided with the filter 91 that opens the gas flow path 80a of the duct 80 when the gas pressure in the second storage space 70b reaches equal to or more than a predetermined value relative to the atmospheric pressure outside the housing 70. This allows the gas flow path 80a to open if a large amount of gas is released from the battery cell 20 due to an abnormality in the battery cell 20, thereby ensuring that the battery pack 100 is not damaged.

The gas released from the gas release valve 10 of the battery cell 20 mainly accumulates in the gas reservoir (the gap in the second storage space 70b). The gas reservoir is placed at a predetermined distance from the battery module 30, which further suppresses a temperature rise of the other battery cells 20 due to the high temperature gas released from the battery cell 20.

Second Embodiment

Figure 8:
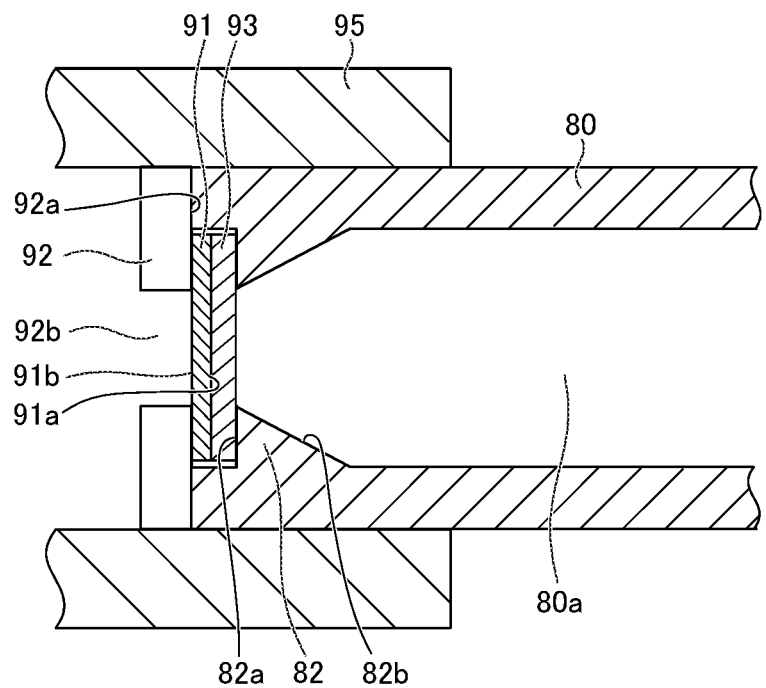
FIG. 8 is a cross-sectional view of the structure around the duct of a battery pack according to a second embodiment of the present invention.

As shown in FIG. 8, a battery pack 100 of a second embodiment of the present invention is configured so that the portion of the duct 80 upstream of the filter 91 has an engagement protrusion 82 that holds the edge of the filter 91 along the entire inner peripheral face of the duct 80. The engagement protrusion 82 may be configured so as to hold the filter 91 at a plurality of locations (partially) as long as the filter 91 can be held. The engagement protrusion 82 has a first holding face 82a facing the edge of one face 91a of the filter 91 and an inclined face (narrowing part) 82b that extends from the inner end of the first holding face 82a to the inner face of the duct 80. The inclined face 82b is configured so that the inner diameter decreases from the upstream (close to the second storage space 70b) to the downstream (the opposite side of the second storage space 70b). This makes the cross-sectional area of the gas flow path 80a smaller toward the downstream.

As described above, this embodiment is configured so that the part of the duct 80 upstream of the filter 91 has the inclined face 82b that narrows the cross-section of the gas flow path 80a at a position in close proximity to the filter 91. When a large amount of gas is released from the gas release valve 10 of a battery cell 20, the gas flows into the gas flow path 80a. At this time, the reduced cross-sectional area of the gas flow path 80a due to the inclined face 82b increases the speed of flow of the gas passing through the inside of the inclined face 82b. This increases the wind pressure (gas pressure) against the filter 91. Further, the gas pressure is concentrated on the central portion of the filter 91. These make it easier to detach the filter 91 when a large amount of gas is released from the gas release valve 10 of a battery cell 20 and the gas pressure inside the battery pack 100 rises rapidly, thus ensuring that the gas inside the battery pack 100 is released outside the vehicle.

Other configurations and advantageous effects of the second embodiment are the same as in the first embodiment above.

Third Embodiment

Figure 9:
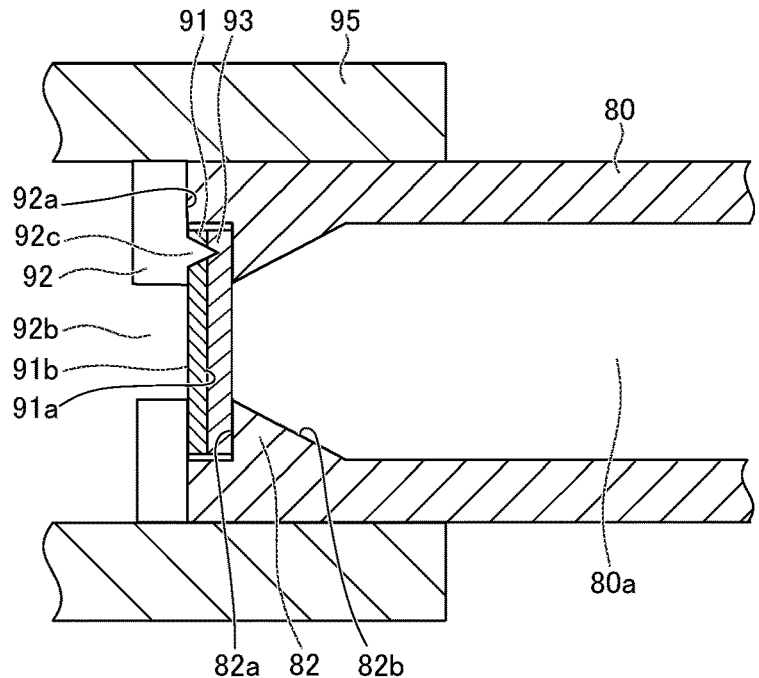
FIG. 9 is a cross-sectional view of the structure around the duct of a battery pack according to a third embodiment of the present invention.

As shown in FIG. 9, a battery pack 100 of a third embodiment of the present invention is configured so that a second holding face 92a of a holder 92 has a protrusion 92c at a predetermined position, the protrusion 92c protruding toward a first holding face 82a. This protrusion 92c and the first holding face 82a sandwich a filter 91 and a non-woven fabric 93 therebetween. In one example, the second holding face 92a has only one protrusion 92c to sandwich only a part of the filter 91 and the non-woven fabric 93. When the engagement of the filter 91 is released by the gas pressure, this configuration prevents the filter 91 from flying into the pipe 95, and thus prevents the filter 91 from adhering to the pipe 95 or clogging the pipe 95.

The protrusion 92c is placed at a predetermined distance from the first holding face 82a. The distance between the protrusion 92c and the first holding face 82a is set smaller than the thickness of the filter 91, for example. This allows the filter 91 to be securely caught by the protrusion 92c and the first holding face 82a.

The number of the protrusions 92c is not particularly limited. To firmly hold the filter 91, a plurality of protrusions 92c can be formed to catch the peripheral edge of the filter 91 along the entire circumference. In this case, however, the filter 91 will not come off even if the pressure rises above the limit pressure. Therefore, to reliably cancel the engagement of the filter 91 by a differential pressure, the protrusion 92c has to be configured to catch only a part of the filter 91.

The above describes the example in which the protrusion 92c is placed on the second holding face 92a. In another example, a protrusion protruding toward the second holding face 92a may be on the first holding face 82a, or protrusions may be on both the first holding face 82a and the second holding face 92a.

Other configurations and advantageous effects of the third embodiment are the same as in the second embodiment above.

Fourth Embodiment

Figure 10:
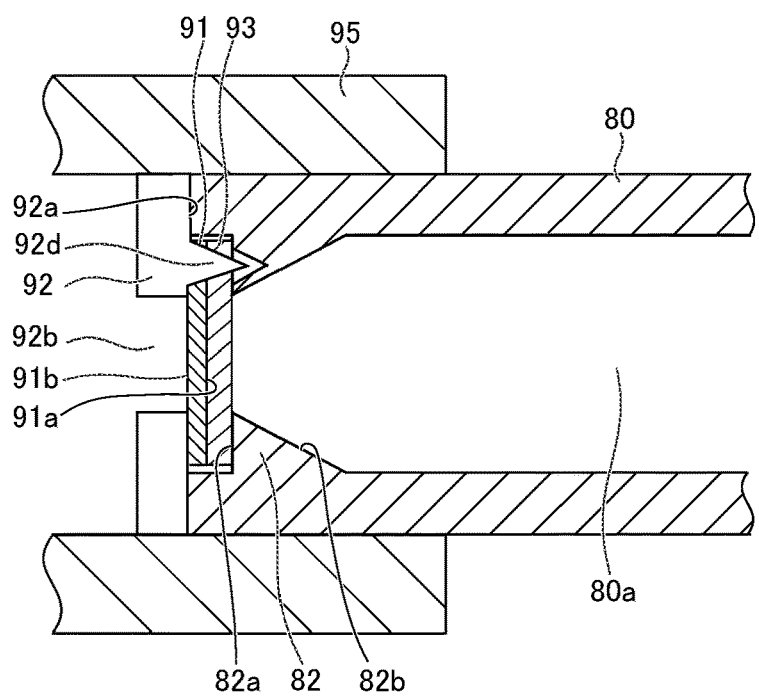
FIG. 10 is a cross-sectional view of the structure around the duct of a battery pack according to a fourth embodiment of the present invention.

As shown in FIG. 10, a battery pack 100 of a fourth embodiment of the present invention is configured so that a second holding face 92a of a holder 92 has a protrusion 92d at a predetermined position, the protrusion 92d protruding toward the first holding face 82a. The first holding face 82a has a recess 82c at a position corresponding to the protrusion 92d. The protrusion 92d of the present embodiment has a larger protrusion than the protrusion 92c of the third embodiment, and enters the recess 82c of the first holding face 82a.

This embodiment having these protrusion 92d and recess 82c allows the filter 91 to penetrate through the filter 91 and the nonwoven fabric 93 for holding them. When the engagement of the filter 91 is released by a gas pressure, this configuration further prevents the filter 91 from flying into the pipe 95, and thus further prevents the filter 91 from adhering to the pipe 95 or clogging the pipe 95.

The above describes the example in which the protrusion 92d is placed on the second holding face 92a and the recess 82c is placed on the first holding face 82a. In another example, a protrusion may be on the first holding face 82a and a recess may be on the second holding face 92a.

Other configurations and advantageous effects of the fourth embodiment are the same as in the third embodiment above.

Fifth Embodiment

Figure 11:
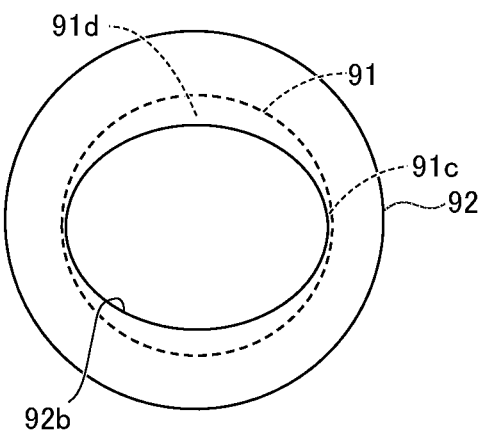
FIG. 11 shows the holder and the filter of the battery pack according to a fifth embodiment of the present invention, viewed from downstream.

As shown in FIG. 11, a battery pack 100 of a fifth embodiment of the present invention is configured so that a through hole 92b in the center of the holder 92 has an elliptical shape when viewed from the downstream. With this configuration, a portion 91c of the edge of the filter 91 corresponding to the long axis of the through hole 92b has a smaller width (distance from the peripheral edge of the through hole 92b to the peripheral edge of the filter 91) in contact (engagement) with the holder 92 than a portion 91d of the edge of the filter 91 corresponding to the short axis of the through hole 92b. This makes it easier to detach the portion 91c of the filter 91 from the holder 92 than the other portions when releasing gas, so that the gas flow path 80a can be opened more reliably. The distance from the peripheral edge of the through hole 92b to the peripheral edge of the filter 91 is the distance from a position of the peripheral edge of the through hole 92b to the nearest position of the peripheral edge of the filter 91.

Figure 12:
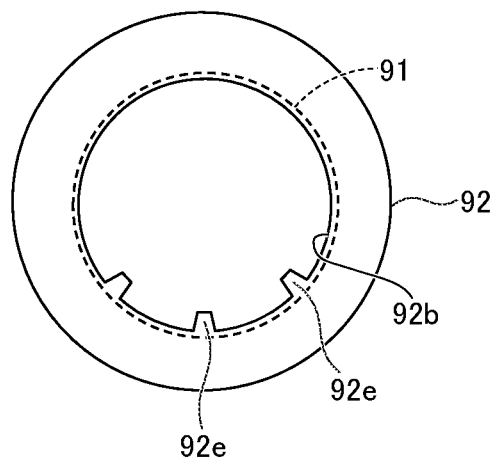
FIG. 12 shows the holder and the filter of a modified example of the fifth embodiment of the present invention, viewed from downstream.

FIG. 11 shows an example in which the width of the filter 91 engaging with the holder 92 is symmetrical in the vertical direction (short axis direction) and the horizontal direction (long axis direction). In another example, the width may be asymmetric in the vertical direction or the horizontal direction. For example, like a modified example of the fifth embodiment shown in FIG. 12, the holder 92 may partially have protrusions 92e that protrude toward the inside of the through hole 92b. As shown in FIGS. 11 and 12, the width of the second holding face 92a (see FIG. 4) of the holder 92 that engages with the edge of the filter 91 varies (not constant) along the circumferential direction of the through hole 92b. This makes it easy to detach a part of the filter 91 from the holder 92, so that the gas flow path 80a can be opened more reliably. The width and position of the holder 92 engaging with the filter 91 vary in this way, which makes it easy to control the operating pressure (pressure for detachment) of the filter 91.

Other configurations and advantageous effects of the fifth embodiment are the same as in the first through fourth embodiments above.

Sixth Embodiment

Figure 13:
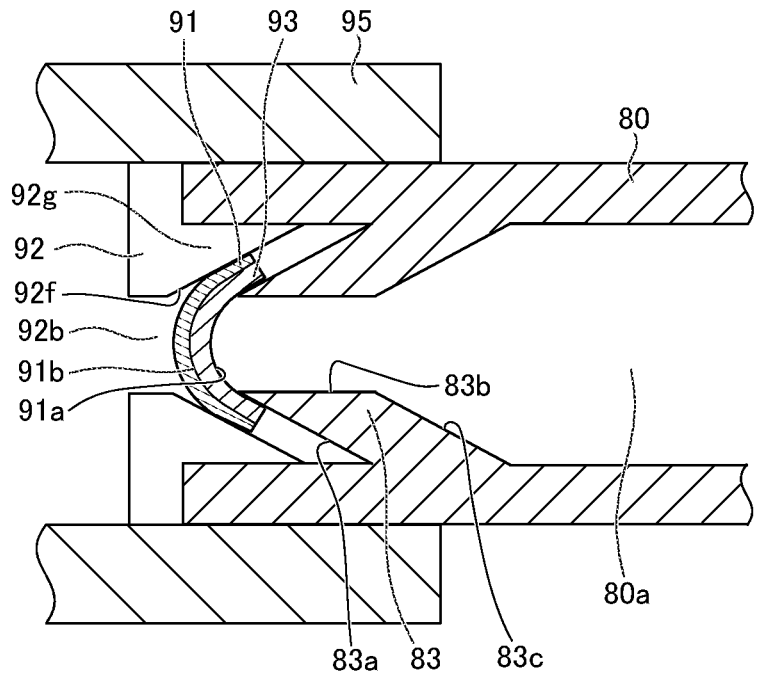
FIG. 13 is a cross-sectional view of the structure around the duct of a battery pack according to a sixth embodiment of the present invention.

As shown in FIG. 13, a battery pack 100 of a sixth embodiment of the present invention is configured so that the portion of the duct 80 upstream of the filter 91 has an engagement protrusion 83 that engages with the edge of the filter 91 along the entire inner peripheral face of the duct 80. The engagement protrusion 83 may be configured so as to hold the filter 91 at a plurality of locations (partially) as long as the filter 91 can be held. The engagement protrusion 83 has a first holding face 83a facing the edge of one face 91a of the filter 91, an inner face 83b that extends from the inner end of the first holding face 83a to the upstream, and an inclined face (narrowing part) 83c that extends from the upstream end of the inner face 83b to the inner face of the duct 80. The first holding face 83a and the inclined face 83c are inclined inwardly from the inner face of the duct 80 to the downstream.

The holder 92 has a protrusion 92g with a second holding face 92f that is opposed to the first holding face 83a and holds a filter 91 and a non-woven fabric 93 with the first holding face 83a. The second holding face 92f is parallel to the first holding face 83a.

The first holding face 83a and the second holding face 92f are inclined relative to the inner face of the duct 80. This configuration holds the filter 91 and the non-woven fabric 93 with the first holding face 83a and the second holding face 92f so that the center portions of the filter 91 and the non-woven fabric 93 are bent to be convex toward the downstream.

As stated above, the present embodiment is configured so that the first holding face 83a and the inclined face 83c, which are inclined inwardly from the inner face of the duct 80 to the downstream, hold the filter 91. This makes the direction in which the filter 91 moves when the filter 91 receives a gas pressure (to the downstream) coincide with the direction in which the filter 91 is detached from between the first holding face 83a and the inclined face 83c (to the downstream). This makes it easier to detach the filter 91 from the holder 92 when the filter 91 receives a gas pressure, so that the gas flow path 80a can be opened more reliably.

Other configurations and advantageous effects of the sixth embodiment are the same as in the second embodiment above.

The present invention is not limited to the above embodiments, and may include various modifications. For instance, the entire detailed configuration of the embodiments described above for explanatory convenience is not always necessary for the present invention. A part of one embodiment may be replaced with the configuration of another embodiment, or the configuration of one embodiment may be added to the configuration of another embodiment. A part of the configuration of each embodiment may include another configuration that is added, or may be deleted or replaced with another configuration.

For example, the above embodiments show a case where the battery cells 20 include secondary batteries. The present invention is not limited to this, and the battery cells 20 may be batteries other than secondary batteries.

Configurations of the above-mentioned embodiments and variations may be combined as appropriate, which also are included in the technical scope of the present invention. For example, a protrusion may be placed on the second holding face 92f or the first holding face 83a of the sixth embodiment.

REFERENCE SIGNS LIST

10 Gas release valve
20 Battery cell
30 Battery module
33 Busbar holder (cover)
35d Cutout (guide)
40 Reinforcing member (metal plate)
50 Electrical unit
70 Housing
70b Second storage space
71 Housing body
72 Lid
80 Duct
80a Gas flow path (passage)
81a, 82a, 83a First holding face
82b, 83c Inclined face (narrowing part)
82c Recess
91 Filter (closing member)
92 Holder
92a, 92f Second holding face
92b Through hole
92c, 92d Protrusion
100 Battery pack

The invention claimed is:
1. A battery pack comprising:
a battery module including a stack of a plurality of battery cells; an electrical unit electrically connected to the battery module; and a housing that stores the battery module and the electrical unit,
each battery cell including a gas release valve, the housing including: a housing body on which the battery module and the electrical unit are disposed; and a lid attached to a top part of the housing body to cover the gas release valves of the plurality of battery cells in the battery module, the housing internally having a first storage space that stores the battery module and a second storage space that stores the electrical unit, the first storage space and the second storage space being in communication while storing the battery module and the electrical unit, the first storage space and the second storage space being disposed side by side in a first direction orthogonal to a stacking direction of the plurality of battery cells and to a normal direction of the lid, a part of the lid defining the second storage space including a duct that communicates the second storage space with an outside of the housing, the duct including a closing member that closes a passage of the duct, in response to a gas pressure in the second storage space reaching a predetermined value or more relative to an atmospheric pressure outside the housing, the closing member opening the flow path of the duct, an inner face defining the first storage space of the housing and the battery module having a first gap therebetween, an inner face defining the second storage space of the housing and the electrical unit having a second gap therebetween, the second gap being larger than the first gap.

2. The battery pack according to claim 1, wherein the battery module further includes a cover disposed to cover the gas release valves of the plurality of battery cells, and the cover has a guide configured to guide gas released from each gas release valve toward the second storage space.

3. The battery pack according to claim 1, wherein the lid includes resin, and a metal plate is disposed between the battery module and the lid, the metal plate covering the battery module.

4. The battery pack according to claim 1, wherein the duct has a narrowing part located closer to the second storage space than the closing member and in close proximity to the closing member, the narrowing part having a smaller cross-section of the passage.

5. The battery pack according to claim 1, wherein at least a part of the housing includes a resin having a tensile yield stress higher than a tensile fracture stress, and the predetermined value is greater than or equal to the tensile fracture stress and less than the tensile yield stress.

6. The battery pack according to claim 1, wherein a holder attached to one end of the duct holds the closing member, the duct has a first holding face facing a peripheral edge of the closing member, the holder has a second holding face facing the peripheral edge of the closing member, and the closing member is held by the duct and the holder with the peripheral edge sandwiched at least between the first holding face and the second holding face.

7. The battery pack according to claim 6, wherein the holder has a through hole penetrating through the holder so that the second holding face is annular, the edge of the through hole of the second holding face comes into contact with the edge of the closing member, and a distance from the peripheral edge of the through hole of the second holding face to the peripheral edge of the closing member varies along the circumferential direction of the through hole.

8. The battery pack according to claim 6, wherein at least one of the first holding face and the second holding face has a protrusion protruding toward at least the other of the first holding face and the second holding face, and the protrusion and the at least other of the first and second holding faces sandwich a part of the closing member.

9. The battery pack according to claim 8, wherein the at least other of the first and second holding faces has a recess at a position corresponding to the protrusion, and the protrusion holds the closing member with a tip of the protrusion in the recess.

10. The battery pack according to claim 1, wherein the battery module has a side face orthogonal to the first direction, and the electrical unit faces the side face of the battery module.

11. A battery pack comprising: a battery module including a stack of a plurality of battery cells; an electrical unit electrically connected to the battery module; and a housing that stores the battery module and the electrical unit, each battery cell including a gas release valve, the housing internally having a first storage space that stores the battery module and a second storage space that stores the electrical unit, the first storage space and the second storage space being in communication while storing the battery module and the electrical unit, a part of the housing defining the second storage space including a duct that communicates the second storage space with an outside of the housing, the duct including a closing member that closes a passage of the duct, in response to a gas pressure in the second storage space reaching a predetermined value or more relative to an atmospheric pressure outside the housing, the closing member opening the flow path of the duct, a holder attached to one end of the duct holding the closing member, the duct having a first holding face facing a peripheral edge of the closing member, the holder having a second holding face facing the peripheral edge of the closing member, the closing member being held by the duct and the holder with the peripheral edge sandwiched at least between the first holding face and the second holding face, the first holding face having a hole that is in communication with the passage of the duct, the closing member having an outer diameter that is larger than a hole diameter of the first holding face and is smaller than an outer diameter of the second holding face.

12. A battery pack comprising: a battery module including a stack of a plurality of battery cells; an electrical unit electrically connected to the battery module; and a housing that stores the battery module and the electrical unit, each battery cell including a gas release valve, the housing internally having a first storage space that stores the battery module and a second storage space that stores the electrical unit, the first storage space and the second storage space being in communication while storing the battery module and the electrical unit, a part of the housing defining the second storage space including a duct that communicates the second storage space with an outside of the housing, the duct including a closing member that closes a passage of the duct, in response to a gas pressure in the second storage space reaching a predetermined value or more relative to an atmospheric pressure outside the housing, the closing member opening the flow path of the duct, the closing member being displaced from an end face of the duct by a thickness of the closing member in a direction from the outside of the housing toward the second storage space.

* * * * *